(12) United States Patent
Sato

(10) Patent No.: US 12,643,509 B2
(45) Date of Patent: Jun. 2, 2026

(54) CONTROLLER AND CONTROL METHOD

(71) Applicant: Robert Bosch GmbH, Stuttgart (DE)

(72) Inventor: Akira Sato, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 18/291,971

(22) PCT Filed: Jul. 22, 2022

(86) PCT No.: PCT/IB2022/056782
§ 371 (c)(1),
(2) Date: Jan. 25, 2024

(87) PCT Pub. No.: WO2023/007330
PCT Pub. Date: Feb. 2, 2023

(65) Prior Publication Data
US 2024/0343232 A1 Oct. 17, 2024

(30) Foreign Application Priority Data
Jul. 29, 2021 (JP) ................................. 2021-123777

(51) Int. Cl.
*B60T 8/17* (2006.01)
*B60T 8/171* (2006.01)
(Continued)

(52) U.S. Cl.
CPC ............ *B60T 8/1706* (2013.01); *B60T 8/171* (2013.01); *B60T 8/172* (2013.01); *B60T 8/261* (2013.01);
(Continued)

(58) Field of Classification Search
CPC ........ B60T 8/1706; B60T 8/171; B60T 8/172; B60T 8/261; B60T 13/142;
(Continued)

(56) References Cited

U.S. PATENT DOCUMENTS 10,086,808 B2 * 10/2018 Kajiyama ................. B60T 8/00
2008/0007115 A1 * 1/2008 Mizutani ............... B60T 8/1755
701/79

FOREIGN PATENT DOCUMENTS

EP 2360075 A1 8/2011
EP 3124369 A2 * 2/2017 ........... B60T 8/1706
(Continued)

OTHER PUBLICATIONS

International Search Report and Written Opinion for Application No. PCT/IB2022/056782 dated Sep. 23, 2022 (9 pages).

*Primary Examiner* — Sizo B Vilakazi
(74) *Attorney, Agent, or Firm* — Michael Best & Friedrich LLP

(57) ABSTRACT

To properly improve safety of a straddle-type vehicle. The controller includes a determination unit and an execution unit. The determination unit (63) determines, based on at least one of a first master cylinder pressure and a second master cylinder pressure, whether a braking operation is performed. The execution unit executes a driving support mode, in which a braking force generated in a straddle-type vehicle is amplified, when the determination unit determines that the braking operation is performed. The execution unit, in the driving support mode, amplifies: the braking force generated in the straddle-type vehicle, based on surrounding environment information about environment around the straddle-type vehicle; the braking force generated in the straddle-type vehicle with the amplification of the second wheel cylinder pressure superior to the amplification of the first wheel cylinder pressure when the rider performs the braking operation with the operation of the first braking operation unit superior to the operation of the second braking operation unit; and the braking force generated in the straddle-type vehicle with the amplification of the first wheel cylinder pressure superior to the amplification of the
(Continued)

100 second wheel cylinder pressure when the rider performs the braking operation with the operation of the second braking operation unit superior to the operation of the first braking operation unit.

11 Claims, 4 Drawing Sheets

(51) Int. Cl.
    B60T 8/172          (2006.01)
    B60T 8/26           (2006.01)
    B60T 13/14         (2006.01)

(52) U.S. Cl.
    CPC ....... B60T 13/142 (2013.01); *B60T 2201/022* (2013.01); *B60T 2201/03* (2013.01); *B60T 2210/32* (2013.01)

(58) Field of Classification Search
    CPC ........... B60T 2201/022; B60T 2201/03; B60T 2210/32; B60T 7/22; B60T 8/1766; B60T 8/3225
    See application file for complete search history.

(56)                  References Cited

FOREIGN PATENT DOCUMENTS

| EP | 3608180 | A1 | 2/2020 |
|----|---------|-----|---------|
| EP | 3828044 | A1 | 6/2021 |
| JP | 2009116882 | A1 | 5/2009 |
| WO | 2020230764 | A1 | 11/2020 |

* cited by examiner

[FIG. 1]
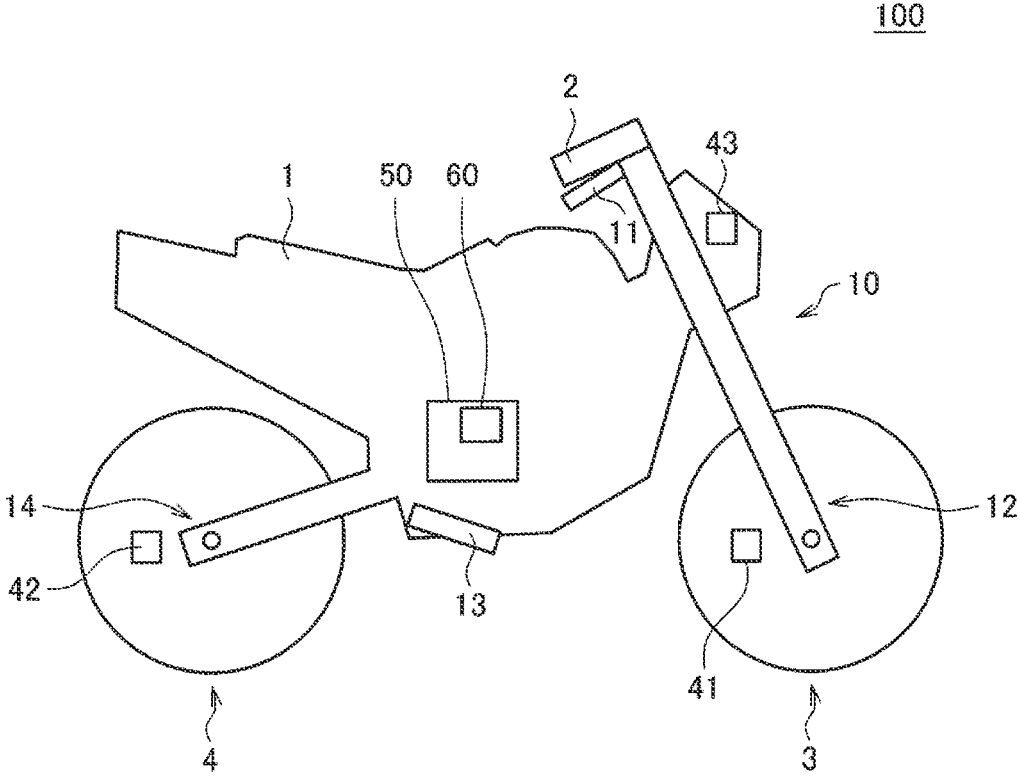

[FIG. 2]
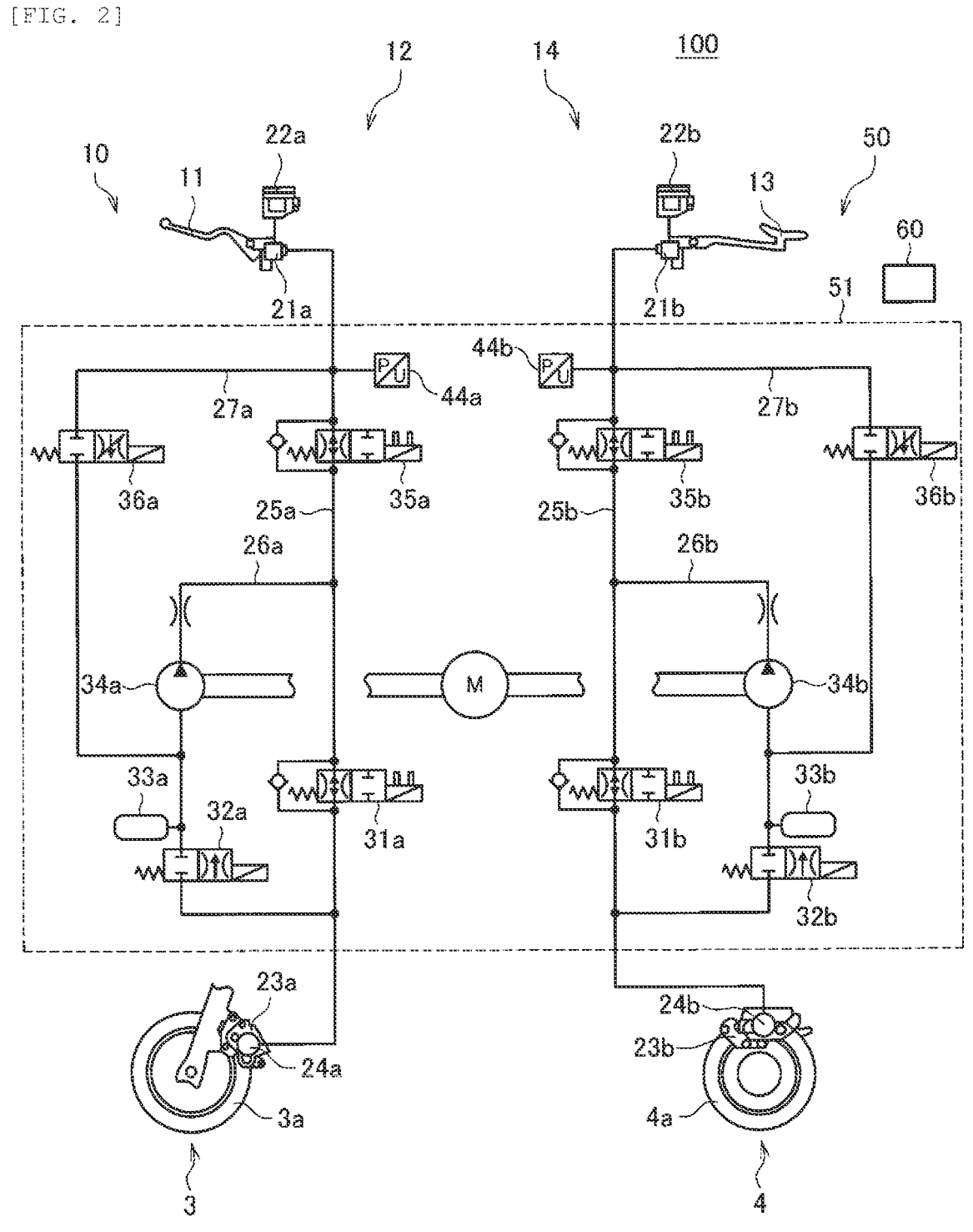

[FIG. 3]
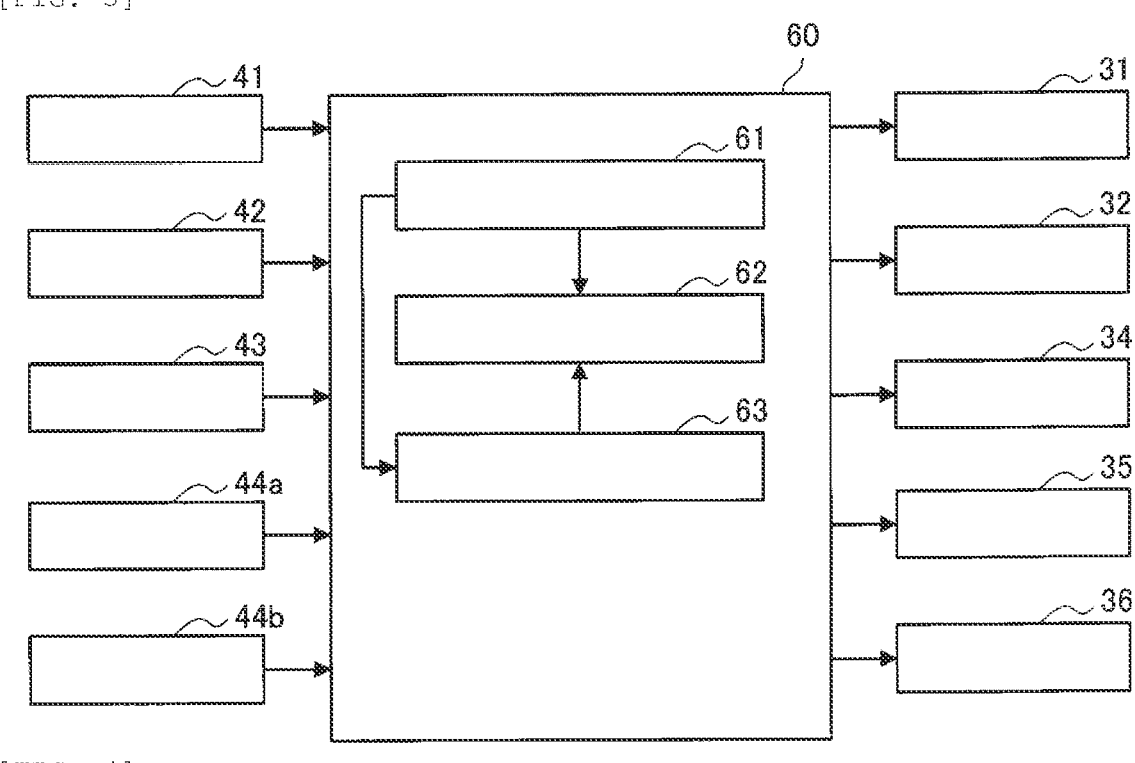
[FIG. 4]
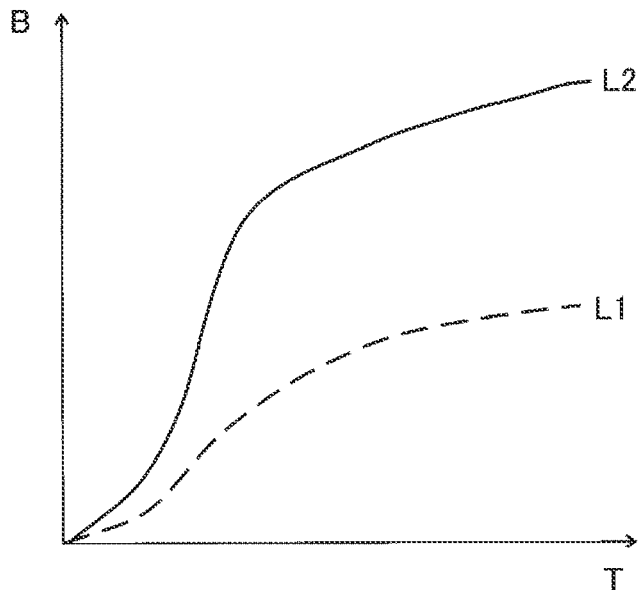

[FIG. 5]
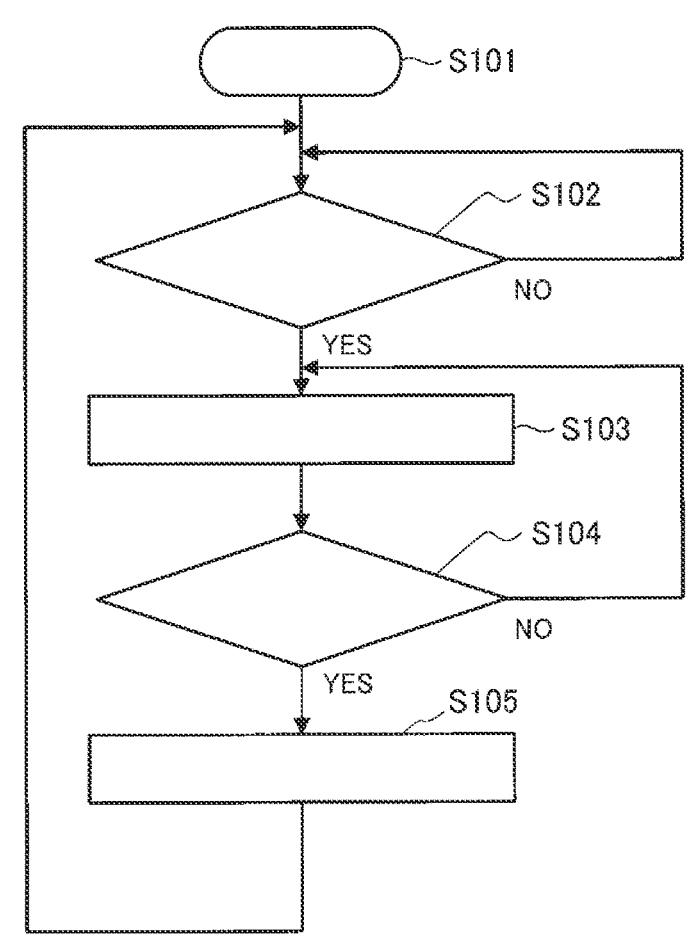
[FIG. 6]

CONTROLLER AND CONTROL METHOD

BACKGROUND

The present disclosure relates to a controller and a control method capable of properly improving safety of a straddle-type vehicle.

As a conventional technique for a straddle-type vehicle, one for improving safety is known.

For example, JP 2009-116882 A describes a driver support system which warns a driver of a motorcycle that the driver is improperly approaching an obstacle based on information detected by a sensor device detecting an obstacle in a traveling direction or substantially a traveling direction.

Incidentally, as a technique of improving safety of a vehicle, there is known a driving support mode capable of amplifying a braking force generated in a vehicle while a driver performs a braking operation. Here, even in a straddle-type vehicle, it is conceivable to use the above-described driving support mode in order to improve safety. In this case, it is desirable to properly improve the safety of the straddle-type vehicle.

SUMMARY

The present invention addresses the above-described issues, and it is an objective of the present invention to provide a controller and a control method capable of properly improving safety of a straddle-type vehicle.

According to one aspect of the present invention, a controller maneuvers a straddle-type vehicle. The straddle-type vehicle includes: a first wheel cylinder which is a wheel cylinder of a front wheel; a first braking operation unit which is a braking operation unit configured to change a first wheel cylinder pressure corresponding to a pressure of a braking liquid of the first wheel cylinder; a first master cylinder provided to the first braking operation unit; a second wheel cylinder which is a wheel cylinder of a rear wheel; a second braking operation unit which is a braking operation unit configured to change a second wheel cylinder pressure corresponding to a pressure of a braking liquid of the second wheel cylinder; and a second master cylinder provided to the second braking operation unit. The controller includes an acquisition unit, a determination unit, and an execution unit. The acquisition unit acquires: a first master cylinder pressure corresponding to a pressure of a braking liquid of the first master cylinder; and a second master cylinder pressure corresponding to a pressure of a braking liquid of the second master cylinder. The determination unit determines, based on at least one of the first master cylinder pressure and the second master cylinder pressure acquired by the acquisition unit, whether a rider of the straddle-type vehicle performs a braking operation. The execution unit executes a driving support mode, in which a braking force generated in the straddle-type vehicle is amplified, when the determination unit determines that the braking operation is performed. The execution unit, in the driving support mode, amplifies: the braking force generated in the straddle-type vehicle, based on surrounding environment information about environment around the straddle-type vehicle; the braking force generated in the straddle-type vehicle with the amplification of the second wheel cylinder pressure superior to the amplification of the first wheel cylinder pressure when the rider performs the braking operation with the operation of the first braking operation unit superior to the operation of the second braking operation unit; and the braking force generated in the straddle-type vehicle with the amplification of the first wheel cylinder pressure superior to the amplification of the second wheel cylinder pressure when the rider performs the braking operation with the operation of the second braking operation unit superior to the operation of the first braking operation unit.

According to one aspect of the present invention, a control method maneuvers a straddle-type vehicle. The straddle-type vehicle includes: a first wheel cylinder which is a wheel cylinder of a front wheel; a first braking operation unit which is a braking operation unit configured to change a first wheel cylinder pressure corresponding to a pressure of a braking liquid of the first wheel cylinder; a first master cylinder provided to the first braking operation unit; a second wheel cylinder which is a wheel cylinder of a rear wheel; a second braking operation unit which is a braking operation unit configured to change a second wheel cylinder pressure corresponding to a pressure of a braking liquid of the second wheel cylinder; and a second master cylinder provided to the second braking operation unit. The control method includes: acquiring, using an acquisition unit of a controller: a first master cylinder pressure corresponding to a pressure of a braking liquid of the first master cylinder; and a second master cylinder pressure corresponding to a pressure of a braking liquid of the second master cylinder; determining, using a determination unit of the controller, whether a rider of the straddle-type vehicle performs a braking operation, based on at least one of the first master cylinder pressure and the second master cylinder pressure acquired by the acquisition unit; and executing, using an execution unit of the controller, a driving support mode, in which a braking force generated in the straddle-type vehicle is amplified, when the determination unit determines that the braking operation is performed. The execution unit, in the driving support mode, amplifies: the braking force generated in the straddle-type vehicle, based on surrounding environment information about environment around the straddle-type vehicle; the braking force generated in the straddle-type vehicle with the amplification of the second wheel cylinder pressure superior to the amplification of the first wheel cylinder pressure when the rider performs the braking operation with the operation of the first braking operation unit superior to the operation of the second braking operation unit; and the braking force generated in the straddle-type vehicle with the amplification of the first wheel cylinder pressure superior to the amplification of the second wheel cylinder pressure when the rider performs the braking operation with the operation of the second braking operation unit superior to the operation of the first braking operation unit.

ADVANTAGEOUS EFFECTS OF INVENTION

According to a controller and control method, the controller includes an acquisition unit, a determination unit, and an execution unit. The acquisition unit acquires: a first master cylinder pressure corresponding to a pressure of a braking liquid of the first master cylinder; and a second master cylinder pressure corresponding to a pressure of a braking liquid of the second master cylinder. The determination unit determines, based on at least one of the first master cylinder pressure and the second master cylinder pressure acquired by the acquisition unit, whether a rider of the straddle-type vehicle performs a braking operation. The execution unit executes a driving support mode, in which a braking force generated in the straddle-type vehicle is amplified, when the determination unit determines that the braking operation is performed. The execution unit, in the driving support mode, amplifies: the braking force generated in the straddle-type vehicle, based on surrounding environment information about environment around the straddle-type vehicle; the braking force generated in the straddle-type vehicle with the amplification of the second wheel cylinder pressure superior to the amplification of the first wheel cylinder pressure when the rider performs the braking operation with the operation of the first braking operation unit superior to the operation of the second braking operation unit; and the braking force generated in the straddle-type vehicle with the amplification of the first wheel cylinder pressure superior to the amplification of the second wheel cylinder pressure when the rider performs the braking operation with the operation of the second braking operation unit superior to the operation of the first braking operation unit. Accordingly, since it is possible to improve the determination accuracy on whether or not the braking operation is performed, it is possible to properly perform the driving support mode depending on whether the braking operation is performed and to suppress a large fluctuation of the braking force generated in the straddle-type vehicle against the rider's intension. Therefore, it is possible to properly improve the safety of the straddle-type vehicle.

BRIEF DESCRIPTION OF THE DRAWINGS

FIG. 1 is a schematic diagram showing a schematic configuration of a straddle-type vehicle according to an embodiment of the present invention.

FIG. 2 is a schematic diagram showing a schematic configuration of a brake system according to the embodiment of the present invention.

FIG. 3 is a block diagram showing an example of a function configuration of a controller according to the embodiment of the present invention.

FIG. 4 is a schematic diagram showing an example of a relationship between a braking force in a normal state corresponding to a braking operation and a braking force generated in the straddle-type vehicle in a driving support mode according to the embodiment of the present invention.

FIG. 5 is a flowchart showing an example of an overall flow of a process for the driving support mode executed by the controller according to the embodiment of the present invention.

FIG. 6 is a flowchart showing an example of a flow of an execution process of the driving support mode executed by the controller according to the embodiment of the present invention.

DETAILED DESCRIPTION

Hereinafter, a controller according to the present invention will be described with reference to the drawings.

Additionally, hereinafter, although a controller used for a two-wheeled motorcycle is described (see a straddle-type vehicle 100 in FIG. 1), a vehicle to be controlled by the controller according to the present invention may be a straddle-type vehicle or may be a straddle-type vehicle other than the two-wheeled motorcycle. The straddle-type vehicle means a vehicle on which a rider straddles. The straddle-type vehicle includes, for example, motorcycles (auto bicycle, auto tribicycle), bicycles, buggies, and the like. Motorcycles include vehicles powered by engines, vehicles powered by electric motors, and the like. Motorcycles include, for example, motorcycles, scooters, electric scooters, and the like. Bicycle means a vehicle that can be propelled on a road by a rider's pedaling force applied to a pedal. Bicycles include ordinary bicycles, electrically assisted bicycles, electric bicycles, and the like.

Further, the configuration and operation described below are examples, and the controller and control method according to the present invention are not limited to such configurations and operations.

Further, hereinafter, the same or similar explanations are properly simplified or omitted. Further, in each drawing, the same or similar members or parts are omitted or given the same reference numerals. Further, the illustration of the fine structure is simplified or omitted as appropriate.

<Configuration of Straddle-Type Vehicle>

Referring to FIGS. 1 to 3, a configuration of the straddle-type vehicle 100 according to the embodiment of the present invention will be described.

FIG. 1 is a schematic diagram showing a schematic configuration of the straddle-type vehicle 100. FIG. 2 is a schematic diagram showing a schematic configuration of a brake system 10.

The straddle-type vehicle 100 is a two-wheeled motorcycle corresponding to an example of the straddle-type vehicle according to the present invention. The straddle-type vehicle 100 includes, as shown in FIGS. 1 and 2, a body 1, a handle 2 which is rotatably held to the body 1, a front wheel 3 which is rotatably held to the body 1 together with the handle 2, a rear wheel 4 which is rotatably held to the body 1, the brake system 10, a hydraulic pressure control unit 50 which is provided to the brake system 10, and a controller (ECU) 60 which is provided to the hydraulic pressure control unit 50. Further, the straddle-type vehicle 100 is provided with a front wheel speed sensor 41, a rear wheel speed sensor 42, a surrounding environment sensor 43, a first master cylinder pressure sensor 44a (see FIG. 2), and a second master cylinder pressure sensor 44b (see FIG. 2) as sensors. Additionally, the straddle-type vehicle 100 includes a drive source such as an engine or an electric motor, and travels using the power output from the drive source.

The brake system 10 includes, as shown in FIGS. 1 and 2, a first braking operation unit 11, a front wheel brake mechanism 12 which brakes the front wheel 3 in synchronization with at least the first braking operation unit 11, a second braking operation unit 13, and a rear wheel brake mechanism 14 which brakes the rear wheel 4 in synchronization with at least the second braking operation unit 13. Further, the brake system 10 includes the hydraulic pressure control unit 50 and a part of the front wheel brake mechanism 12 and a part of the rear wheel brake mechanism 14 are included in the hydraulic pressure control unit 50. The hydraulic pressure control unit 50 is a unit having a function of controlling a braking force generated on the front wheel 3 by the front wheel brake mechanism 12 and a braking force generated on the rear wheel 4 by the rear wheel brake mechanism 14.

The first braking operation unit 11 is provided to the handle 2 and is operated by the rider's hand. The first braking operation unit 11 is, for example, a brake lever. The second braking operation unit 13 is provided to the lower portion of the body 1 and is operated by the rider's foot. The second braking operation unit 13 is, for example, a brake pedal. However, both the first braking operation unit 11 and the second braking operation unit 13 may be brake levers operated by the rider's hand like a braking operation unit of a scooter or the like.

The front wheel brake mechanism 12 includes a first master cylinder 21a which is provided to the first braking operation unit 11, a first reservoir 22a which is provided to the first master cylinder 21a, a first brake caliper 23a which is held to the body 1 and includes a brake pad (not shown), a first wheel cylinder 24a which is provided to the first brake caliper 23a, a main flow path 25a which circulates a braking liquid of the first master cylinder 21a to the first wheel cylinder 24a, a sub-flow path 26a which releases the braking liquid of the first wheel cylinder 24a, and a supply flow path 27a which supplies the braking liquid of the first master cylinder 21a to the sub-flow path 26a.

The main flow path 25a is provided with an inlet valve (EV) 31a. The sub-flow path 26a bypasses between the side of the first wheel cylinder 24a and the side of the first master cylinder 21a with respect to the inlet valve 31a in the main flow path 25a. An outlet valve (AV) 32a, an accumulator 33a, and a pump 34a are provided to the sub-flow path 26a in order from the upstream side. A first valve (USV) 35a is provided between positions in which the end on the side of the first master cylinder 21a and the downstream end of the sub-flow path 26a are connected to the main flow path 25a. The supply flow path 27a communicates between the first master cylinder 21a and the suction side of the pump 34a in the sub-flow path 26a. The supply flow path 27a is provided with a second valve (HSV) 36a.

The rear wheel brake mechanism 14 includes a second master cylinder 21b which is provided to the second braking operation unit 13, a second reservoir 22b which is provided to the second master cylinder 21b, a second brake caliper 23b which is held to the body 1 and includes a brake pad (not shown), a second wheel cylinder 24b which is provided to the second brake caliper 23b, a main flow path 25b which circulates a braking liquid of the second master cylinder 21b to the second wheel cylinder 24b, a sub-flow path 26b which releases the braking liquid of the second wheel cylinder 24b, and a supply flow path 27b which supplies the braking liquid of the second master cylinder 21b to the sub-flow path 26b.

The main flow path 25b is provided with an inlet valve (EV) 31b. The sub-flow path 26b bypasses between the side of the second wheel cylinder 24b and the side of the second master cylinder 21b with respect to the inlet valve 31b in the main flow path 25b. An outlet valve (AV) 32b, an accumulator 33b, and a pump 34b are provided to the sub-flow path 26b in order from the upstream side. A first valve (USV) 35b is provided between positions in which the end on the side of the second master cylinder 21b and the downstream end of the sub-flow path 26b are connected to the main flow path 25b. The supply flow path 27b communicates between the second master cylinder 21b and the suction side of the pump 34b in the sub-flow path 26b. The supply flow path 27b is provided with a second valve (HSV) 36b.

In the brake system 10, the first wheel cylinder 24a is a wheel cylinder of the front wheel 3. The second wheel cylinder 24b is a wheel cylinder of the rear wheel 4. Hereinafter, the pressure of the braking liquid of the wheel cylinder is referred to as the wheel cylinder pressure. The first braking operation unit 11 is a braking operation unit which changes a first wheel cylinder pressure corresponding to the pressure of the braking liquid of the first wheel cylinder 24a. The second braking operation unit 13 is a braking operation unit which changes a second wheel cylinder pressure corresponding to the pressure of the braking liquid of the second wheel cylinder 24b. The first master cylinder 21a is a master cylinder which is provided to the first braking operation unit 11. The second master cylinder 21b is a master cylinder which is provided to the second braking operation unit 13. Hereinafter, the pressure of the braking liquid of the master cylinder is referred to as a master cylinder pressure.

Additionally, hereinafter, the main flow path 25a and the main flow path 25b are simply referred to as a main flow path 25 when they are not particularly distinguished from each other. The sub-flow path 26a and the sub-flow path 26b are simply referred to as a sub-flow path 26 when they are not particularly distinguished from each other. The supply flow path 27a and the supply flow path 27b are simply referred to as a supply flow path 27 when they are not particularly distinguished from each other. The inlet valve 31a and the inlet valve 31b are simply referred to as an inlet valve 31 when they are not particularly distinguished from each other. The outlet valve 32a and the outlet valve 32b are simply referred to as an outlet valve 32 when they are not particularly distinguished from each other. The accumulator 33a and the accumulator 33b are simply referred to as an accumulator 33 when they are not particularly distinguished from each other. The pump 34a and the pump 34b are simply referred to as a pump 34 when they are not particularly distinguished from each other. The first valve 35a and the first valve 35b are simply referred to as a first valve 35 when they are not particularly distinguished from each other. The second valve 36a and the second valve 36b are simply referred to as a second valve 36 when they are not particularly distinguished from each other.

The inlet valve 31 is, for example, an electromagnetic valve which is opened in a non-energized state and is closed in an energized state. The outlet valve 32 is, for example, an electromagnetic valve which is closed in a non-energized state and is opened in an energized state. The first valve 35 is, for example, an electromagnetic valve which is opened in a non-energized state and is closed in an energized state. The second valve 36 is, for example, an electromagnetic valve which is closed in a non-energized state and is opened in an energized state.

The hydraulic pressure control unit 50 includes components which include the inlet valve 31, the outlet valve 32, the accumulator 33, the pump 34, the first valve 35, and the second valve 36 and control the brake hydraulic pressure, a base body 51 which is provided with such components and forms a flow path constituting the main flow path 25, the sub-flow path 26, and the supply flow path 27 therein, and the controller 60.

Additionally, the base body 51 may be formed by one member or may be formed by a plurality of members. Further, when the base body 51 is formed by a plurality of members, each component may be provided separately in different members.

The operation of each component of the hydraulic pressure control unit 50 is controlled by the controller 60. Accordingly, the braking force generated in the front wheel 3 by the front wheel brake mechanism 12 and the braking force generated in the rear wheel 4 by the rear wheel brake mechanism 14 are controlled.

In a normal state (that is, when the controller 60 is set to generate a braking force according to the braking operation by the rider in the wheel), the controller 60 opens the inlet valve 31, closes the outlet valve 32, opens the first valve 35, and closes the second valve 36. In that state, when the first braking operation unit 11 is operated, a piston (not shown) of the first master cylinder 21a is pressed in to increase the first wheel cylinder pressure of the first wheel cylinder 24a in the front wheel brake mechanism 12 and a brake pad (not shown) of the first brake caliper 23a is pressed against a rotor 3a of the front wheel 3 to generate a braking force in the front wheel 3. Further, when the second braking operation unit 13 is operated, a piston (not shown) of the second master cylinder 21b is pressed in to increase the second wheel cylinder pressure of the second wheel cylinder 24*b* in the rear wheel brake mechanism 14 and a brake pad (not shown) of the second brake caliper 23*b* is pressed against a rotor 4*a* of the rear wheel 4 to generate a braking force in the rear wheel 4.

The front wheel speed sensor 41 is a wheel speed sensor that detects the wheel speed of the front wheel 3 (for example, the number of rotations [rpm] per unit time or the distance traveled [km/h] per unit time of the front wheel 3) and outputs the detection result. The front wheel speed sensor 41 may detect other physical quantities that can be substantially converted into the wheel speed of the front wheel 3. The front wheel speed sensor 41 is provided to the front wheel 3.

The rear wheel speed sensor 42 is a wheel speed sensor that detects the wheel speed of the rear wheel 4 (for example, the number of rotations [rpm] per unit time or the distance traveled [km/h] per unit time of the rear wheel 4) and outputs the detection result. The rear wheel speed sensor 42 may detect other physical quantities that can be substantially converted into the wheel speed of the rear wheel 4. The rear wheel speed sensor 42 is provided to the rear wheel 4.

The surrounding environment sensor 43 detects surrounding environment information about the environment around the straddle-type vehicle 100. For example, the surrounding environment sensor 43 is provided to the front part of the body of the straddle-type vehicle 100 and detects surrounding environment information in front of the straddle-type vehicle 100. The surrounding environment information detected by the surrounding environment sensor 43 is output to the controller 60.

The surrounding environment information detected by the surrounding environment sensor 43 may be information related to the distance or orientation to a subject located around the straddle-type vehicle 100 (for example, relative position, relative distance, relative speed, relative acceleration, etc.) and a feature of the subject located around the straddle-type vehicle 100 (for example, the type of the subject, the shape of the subject itself, the mark attached to the subject, etc.). The surrounding environment sensor 43 is, for example, a radar, a Lidar sensor, an ultrasonic sensor, a camera, or the like.

Additionally, the surrounding environment information can also be detected by the surrounding environment sensor mounted to the other vehicle or the infrastructure equipment. That is, the controller 60 can also acquire the surrounding environment information via wireless communication with the other vehicle or infrastructure equipment.

The first master cylinder pressure sensor 44*a* detects the first master cylinder pressure which is a pressure of the braking liquid of the first master cylinder 21*a* and outputs the detection result. The first master cylinder pressure sensor 44*a* may detect other physical quantities that can be substantially converted into the first master cylinder pressure.

The second master cylinder pressure sensor 44*b* detects the second master cylinder pressure which is a pressure of the braking liquid of the second master cylinder 21*b* and outputs the detection result. The second master cylinder pressure sensor 44*b* may detect other physical quantities that can be substantially converted into the second master cylinder pressure.

The controller 60 maneuvers the straddle-type vehicle 100, i.e., controls the behavior of the straddle-type vehicle 100. For example, a part or all of the controller 60 is composed of a microcomputer, a microprocessor unit, and the like. Further, for example, a part or all of the controller 60 may be configured by an updatable device such as firmware or may be a program module or the like executed by a command from a CPU or the like. The controller 60 may be, for example, one or may be divided into a plurality of controllers 60.

The controller 60 includes, as shown in FIG. 3, for example, an acquisition unit 61, an execution unit 62, and a determination unit 63.

The acquisition unit 61 acquires information from each device mounted to the straddle-type vehicle 100 and outputs the information to the execution unit 62 and the determination unit 63. For example, the acquisition unit 61 acquires information from the front wheel speed sensor 41, the rear wheel speed sensor 42, the surrounding environment sensor 43, the first master cylinder pressure sensor 44*a*, and the second master cylinder pressure sensor 44*b*. In addition, in this specification, the acquisition of information may include extraction or generation of information.

The execution unit 62 executes braking control for controlling the braking force generated in the straddle-type vehicle 100 to maneuver the straddle-type vehicle 100. Specifically, the execution unit 62 controls the operation of each component of the hydraulic pressure control unit 50 of the brake system 10 in the braking control.

As described above, in a normal state, the execution unit 62 controls the operation of each component of the hydraulic pressure control unit 50 so that the braking force according to the rider's braking operation is generated in the vehicle wheel. On the other hand, in a specific case, the execution unit 62 executes braking control different from the normal state.

For example, the execution unit 62 executes anti-lock brake control when the wheels are locked or may be locked. In the anti-lock brake control, the braking force of the wheels is adjusted to a braking force that can avoid locking.

When the anti-lock brake control is activated, the execution unit 62 closes the inlet valve 31, opens the outlet valve 32, opens the first valve 35, and closes the second valve 36 and drives the pump 34 in that state to decrease the wheel cylinder pressure and decrease the braking force generated in the vehicle wheel. Then, the execution unit 62 closes both the inlet valve 31 and the outlet valve 32 from the above state to maintain the wheel cylinder pressure and keep the braking force generated in the vehicle wheel. Then, the execution unit 62 opens the inlet valve 31 and closes the outlet valve 32 to increase the wheel cylinder pressure and increase the braking force generated in the vehicle wheel.

When the anti-lock brake control is activated, as described above, the braking force decreasing control for decreasing the braking force generated in the vehicle wheel, the braking force keeping control for keeping the braking force generated in the vehicle wheel, and the braking force increasing control for increasing the braking force generated in the vehicle wheel are repeated in this order.

Here, the execution unit 62 executes the driving support mode capable of amplifying the braking force generated in the straddle-type vehicle 100 in a state in which the rider of the straddle-type vehicle 100 performs the braking operation. The amplification of the braking force generated in the straddle-type vehicle 100 means that the braking force generated in the straddle-type vehicle 100 becomes larger than the normal braking force according to the braking operation. Hereinafter, the driving support mode capable of amplifying the braking force generated in the straddle-type vehicle 100 is simply referred to as the driving support mode.

In the driving support mode, the execution unit 62 amplifies the braking force generated in the straddle-type vehicle 100 based on the surrounding environment information about environment around the straddle-type vehicle 100.

For example, the surrounding environment information includes information about the possibility of collision of the straddle-type vehicle 100. The collision possibility information can be acquired based on, for example, the inter-vehicle distance between the straddle-type vehicle 100 and the preceding vehicle and the relative speed of the straddle-type vehicle 100 with respect to the preceding vehicle. Since the braking force generated in the straddle-type vehicle 100 is amplified based on the collision possibility information, the possibility of avoiding the collision with the preceding vehicle or the like is improved and the safety is improved.

Further, for example, the surrounding environment information includes information about the inter-vehicle distance between the straddle-type vehicle 100 and a target vehicle. As the target vehicle, for example, the preceding vehicle traveling in front of the straddle-type vehicle 100 can be set. Since the amplification of the braking force generated in the straddle-type vehicle 100 is executed based on the information about the inter-vehicle distance, the inter-vehicle distance with respect to the target vehicle such as the preceding vehicle is properly ensured and the safety is improved. Additionally, the inter-vehicle distance may mean a distance in a direction along a lane (specifically, a traveling lane of the straddle-type vehicle 100) or may mean a straight-line distance. The information about the inter-vehicle distance may be the inter-vehicle distance itself, one obtained by dividing the inter-vehicle distance by the speed of the straddle-type vehicle 100, that is, a difference in passage time between the straddle-type vehicle 100 and the target vehicle, and other physical quantities that can be substantially converted into them.

Since the pump 34 is driven while the execution unit 62 opens the inlet valve 31, closes the outlet valve 32, closes the first valve 35, and opens the second valve 36 during the activation of the driving support mode, the wheel cylinder pressure is increased. Accordingly, the wheel cylinder pressure increases with respect to the normal pressure according to the braking operation. That is, the wheel cylinder pressure is amplified. Therefore, the braking force generated in the vehicle wheel increases with respect to the normal braking force according to the braking operation. Accordingly, the braking force generated in the straddle-type vehicle 100 can be amplified.

The execution unit 62 can independently control the braking force of the front wheel 3 and the braking force of the rear wheel 4 by independently controlling the front wheel brake mechanism 12 and the rear wheel brake mechanism 14 in the driving support mode. That is, the execution unit 62 can independently control the amplification of the first wheel cylinder pressure of the first wheel cylinder 24a and the amplification of the second wheel cylinder pressure of the second wheel cylinder 24b in the driving support mode.

The determination unit 63 makes various determinations and outputs the determination result to the execution unit 62. Particularly, the determination unit 63 determines whether or not the rider of the straddle-type vehicle 100 performs the braking operation based on at least one of the first master cylinder pressure and the second master cylinder pressure acquired by the acquisition unit 61. The execution unit 62 executes the driving support mode when the determination unit 63 determines that the braking operation is performed.

<Operation of Controller>

An operation of the controller 60 according to the embodiment of the present invention will be described with reference to FIGS. 4 to 6.

As described above, in this embodiment, the execution unit 62 executes the driving support mode capable of amplifying the braking force generated in the straddle-type vehicle 100 in a state in which the rider of the straddle-type vehicle 100 performs the braking operation.

FIG. 4 is a schematic diagram showing an example of a relationship between the normal braking force according to the braking operation and the braking force generated in the straddle-type vehicle in the driving support mode. In FIG. 4, the horizontal axis T indicates the time and the vertical axis B indicates the braking force. Further, in FIG. 4, a dashed line L1 indicates the normal braking force according to the braking operation and a solid line L2 indicates the braking force generated in the straddle-type vehicle 100 in the driving support mode. As shown in FIG. 4, the braking force generated in the straddle-type vehicle 100 indicated by the solid line L2 is controlled to be larger than the normal braking force indicated by the dashed line L1 in the driving support mode. That is, the braking force generated in the straddle-type vehicle 100 is amplified.

Incidentally, as described above, it is determined whether or not the rider of the straddle-type vehicle 100 performs the braking operation based on the master cylinder pressure. Here, in the driving support mode, when the wheel cylinder pressure of the wheel cylinder is amplified, the master cylinder pressure of the master cylinder provided to the same braking mechanism as that of the wheel cylinder decreases. Accordingly, the accuracy of determining whether or not the rider performs the braking operation may be decreased.

In the driving support mode, if the first wheel cylinder pressure of the first wheel cylinder 24a is amplified when the rider performs the braking operation using the first braking operation unit 11, the first master cylinder pressure of the first master cylinder 21a decreases. At this time, for example, when the first master cylinder pressure decreases excessively, the piston of the first master cylinder 21a is sucked so that the first braking operation unit 11 is not displaced even when the braking operation is released. This state is also called lever suction.

Further, in the driving support mode, if the second wheel cylinder pressure of the second wheel cylinder 24b is amplified when the rider performs the braking operation using the second braking operation unit 13, the second master cylinder pressure of the second master cylinder 21b decreases. At this time, for example, when the second master cylinder pressure decreases excessively, the piston of the second master cylinder 21b is sucked so that the second braking operation unit 13 is not displaced even when the braking operation is released. This state is also called pedal suction.

For example, when the above lever suction or pedal suction occurs, it becomes difficult to determine whether or not the rider performs the braking operation. Therefore, it becomes difficult to properly execute the driving support mode depending on whether or not the braking operation is performed. Thus, the braking force generated in the straddle-type vehicle 100 may fluctuate against the intention of the rider. In particular, as in this embodiment, in the driving support mode, when the braking force generated in the straddle-type vehicle 100 is amplified based on the surrounding environment information, the braking force generated in the straddle-type vehicle 100 tends to fluctuate greatly against the intention of the rider.

Here, in this embodiment, the execution unit 62 of the controller 60 properly amplifies the braking force generated in the straddle-type vehicle 100 in accordance with the rider's braking operation state in the driving support mode. Accordingly, the appropriate improvement in safety of the straddle-type vehicle 100 is realized. Hereinafter, a process related to the driving support mode executed by such a controller 60 will be described.

FIG. 5 is a flowchart showing an example of an overall flow of a process related to the driving support mode executed by the controller 60. step S101 in FIG. 5 corresponds to the start of the control flow shown in FIG. 5.

When the control flow shown in FIG. 5 is started, in step S102, the determination unit 63 determines whether or not the start condition of the driving support mode is satisfied. Here, whether or not to start the driving support mode is determined based on the surrounding environment information. The start condition of the driving support mode is different in accordance with the type of surrounding environment information used in the driving support mode.

For example, when the collision possibility information is used as the surrounding environment information, the condition that the rider performs the braking operation and the possibility of collision of the straddle-type vehicle 100 is above a reference value can be used as the start condition of the driving support mode. The collision possibility information is information about whether the straddle-type vehicle 100 possibly collides with an object.

Further, for example, when the information about the inter-vehicle distance between the straddle-type vehicle 100 and the target vehicle is used as the surrounding environment information, the condition that the rider performs the braking operation and the inter-vehicle distance between the straddle-type vehicle 100 and the target vehicle is shorter than a reference distance or the passage time difference is shorter than a reference time can be used as the start condition of the driving support mode.

When it is determined that the start condition of the driving support mode is not satisfied (step S102/NO), the process of step S102 is repeated. On the other hand, when it is determined that the start condition of the driving support mode is satisfied (step S102/YES), the process proceeds to step S103.

When the determination is YES in step S102, in step S103, the execution unit 62 executes the driving support mode. As described above, in the driving support mode, the execution unit 62 amplifies the braking force generated in the straddle-type vehicle 100 based on the surrounding environment information about environment around the straddle-type vehicle 100.

For example, in the driving support mode, the execution unit 62 amplifies the braking force generated in the straddle-type vehicle 100 based on the collision possibility information so as to avoid the collision with the preceding vehicle. In this case, the execution unit 62 determines the deceleration capable of avoiding the collision with the preceding vehicle as a target deceleration. For example, the execution unit 62 determines a larger deceleration as the target deceleration as the possibility of collision increases. Then, the execution unit 62 amplifies the braking force generated in the straddle-type vehicle 100 so that the target deceleration is generated in the straddle-type vehicle 100.

Further, for example, in the driving support mode, the execution unit 62 amplifies the braking force generated in the straddle-type vehicle 100 based on the information about the inter-vehicle distance so that the inter-vehicle distance or the passage time difference between the straddle-type vehicle 100 and the target vehicle is maintained at a target value. In this case, the execution unit 62 determines a deceleration in which the inter-vehicle distance or the passage time difference between the straddle-type vehicle 100 and the target vehicle is maintained at the target value as the target deceleration. For example, the execution unit 62 determines a larger braking force as the target deceleration as the inter-vehicle distance or the passage time difference between the straddle-type vehicle 100 and the target vehicle becomes shorter. Then, the execution unit 62 amplifies the braking force generated in the straddle-type vehicle 100 so that the target deceleration is generated in the straddle-type vehicle 100.

In step S104 after step S103, the determination unit 63 determines whether or not the end condition of the driving support mode is satisfied.

The end condition of the driving support mode is a condition that the start condition is not satisfied. For example, the condition that the rider's braking operation is released may correspond to the end condition. Further, for example, the condition that the possibility of collision of the straddle-type vehicle 100 is below the reference value may correspond to the end condition. Further, for example, the inter-vehicle distance between the straddle-type vehicle 100 and the target vehicle is above the reference distance or the passage time difference is above the reference time may correspond to the end condition.

When it is determined that the end condition of the driving support mode is not satisfied (step S104/NO), the process returns to step S103. On the other hand, when it is determined that the end condition of the driving support mode is satisfied (step S104/YES), the process proceeds to step S105, the execution unit 62 ends the driving support mode, and the process returns to step S102.

FIG. 6 is a flowchart showing an example of a flow of an execution process of the driving support mode executed by the controller 60. The control flow shown in FIG. 6 is executed in step S103 in the control flow shown in FIG. 5. Step S201 in FIG. 6 corresponds to the start of the control flow shown in FIG. 6. Step S205 in FIG. 6 corresponds to the end of the control flow shown in FIG. 6.

When the control flow shown in FIG. 6 is started, in step S202, the determination unit 63 determines whether or not the rider performs the braking operation with the operation of the first braking operation unit 11 superior to the operation of the second braking operation unit 13.

For example, when the first braking operation unit 11 is operated but the second braking operation unit 13 is not operated, the determination unit 63 may determine that the rider performs the braking operation with the operation of the first braking operation unit 11 superior to the operation of the second braking operation unit 13. On the other hand, when the second braking operation unit 13 is operated but the first braking operation unit 11 is not operated, the determination unit 63 may determine that the rider performs the braking operation with the operation of the second braking operation unit 13 superior to the operation of the first braking operation unit 11.

Additionally, the determination unit 63 can determine whether or not the first braking operation unit 11 is operated based on the first master cylinder pressure. Further, the determination unit 63 can determine whether or not the second braking operation unit 13 is operated based on the second master cylinder pressure.

Further, for example, when the braking operation is performed by using both the first braking operation unit 11 and the second braking operation unit 13 and the operation amount of the first braking operation unit 11 is larger than the operation amount of the second braking operation unit 13, the determination unit 63 may determine that the rider performs the braking operation with the operation of the first braking operation unit 11 superior to the operation of the second braking operation unit 13. On the other hand, when the braking operation is performed by using both the first braking operation unit 11 and the second braking operation unit 13 and the operation amount of the second braking operation unit 13 is larger than the operation amount of the first braking operation unit 11, the determination unit 63 may determine that the rider performs the braking operation with the operation of the second braking operation unit 13 superior to the operation of the first braking operation unit 11.

Additionally, the determination unit 63 can acquire the operation amount of the first braking operation unit 11 based on the first master cylinder pressure. Further, the determination unit 63 can acquire the operation amount of the second braking operation unit 13 based on the second master cylinder pressure.

When it is determined that the rider performs the braking operation with the operation of the first braking operation unit 11 superior to the operation of the second braking operation unit 13 (step S202/YES), the process proceeds to step S203. On the other hand, when it is determined that the rider performs the braking operation with the operation of the second braking operation unit 13 superior to the operation of the first braking operation unit 11 (step S202/NO), the process proceeds to step S204.

In other words, a case in which the determination is YES in step S202 is a case in which the braking operation is performed with the operation of the first braking operation unit 11 stronger than the operation of the second braking operation unit 13. In this case, in step S203, the execution unit 62 amplifies the braking force generated in the straddle-type vehicle 100 with the amplification of the second wheel cylinder pressure superior to the amplification of the first wheel cylinder pressure and ends the control flow shown in FIG. 6.

In step S203, the execution unit 62 prohibits, for example, the amplification of the first wheel cylinder pressure and amplifies the braking force generated in the straddle-type vehicle 100. In this case, the execution unit 62 amplifies the braking force generated in the straddle-type vehicle 100 by amplifying the second wheel cylinder pressure without amplifying the first wheel cylinder pressure.

As described above, when it is determined that the rider performs the braking operation with the operation of the first braking operation unit 11 superior to the operation of the second braking operation unit 13, the execution unit 62 prohibits, for example, the amplification of the first wheel cylinder pressure and amplifies the braking force generated in the straddle-type vehicle 100. For example, when the first braking operation unit 11 is operated but the second braking operation unit 13 is not operated, the execution unit 62 prohibits the amplification of the first wheel cylinder pressure and amplifies the braking force generated in the straddle-type vehicle 100. Accordingly, it is possible to effectively suppress a decrease in the first master cylinder pressure due to the amplification of the first wheel cylinder pressure. For example, it is possible to suppress the occurrence of lever suction. Therefore, it is possible to effectively suppress a decrease in the determination accuracy on whether or not the first braking operation unit 11 mainly used in the braking operation is operated.

Further, in step S203, for example, the execution unit 62 amplifies the second wheel cylinder pressure more than the first wheel cylinder pressure and amplifies the braking force generated in the straddle-type vehicle 100. In this case, for example, the execution unit 62 may perform the amplification of the first wheel cylinder pressure and the amplification of the second wheel cylinder pressure so that the amplification amount of the second wheel cylinder pressure becomes larger than the amplification amount of the first wheel cylinder pressure. Further, for example, the execution unit 62 may perform the amplification of the first wheel cylinder pressure and the amplification of the second wheel cylinder pressure so that the change gradient of the second wheel cylinder pressure becomes larger than the change gradient of the first wheel cylinder pressure.

As described above, when it is determined that the rider performs the braking operation with the operation of the first braking operation unit 11 superior to the operation of the second braking operation unit 13, for example, the execution unit 62 amplifies the second wheel cylinder pressure more than the first wheel cylinder pressure and amplifies the braking force generated in the straddle-type vehicle 100. For example, when the first braking operation unit 11 is operated but the second braking operation unit 13 is not operated, the execution unit 62 amplifies the second wheel cylinder pressure more than the first wheel cylinder pressure and amplifies the braking force generated in the straddle-type vehicle 100. Accordingly, it is possible to suppress a decrease in the first master cylinder pressure due to the amplification of the first wheel cylinder pressure and to suppress a decrease in the determination accuracy on whether or not the first braking operation unit 11 is operated as in the case of prohibiting the amplification of the first wheel cylinder pressure and amplifying the braking force generated in the straddle-type vehicle 100.

Here, the execution unit 62 may amplify the braking force generated in the straddle-type vehicle 100 based on the information about the operation amount of the first braking operation unit 11. Accordingly, it is possible to optimize the amplification of the braking force generated in the straddle-type vehicle 100 according to the rider's intention in the driving support mode. The information about the operation amount of the first braking operation unit 11 can include, for example, the operation amount itself of the first braking operation unit 11 and the change gradient of the operation amount of the first braking operation unit 11. Additionally, the determination unit 63 can acquire the operation amount of the first braking operation unit 11 and the change gradient of the operation amount based on the first master cylinder pressure.

For example, the execution unit 62 may change the amplification amount of the braking force in the amplification of the braking force generated in the straddle-type vehicle 100 based on the operation amount itself of the first braking operation unit 11 or may change the amplification amount based on the change gradient of the operation amount of the first braking operation unit 11. Further, for example, the execution unit 62 may change the change gradient of the braking force in the amplification of the braking force generated in the straddle-type vehicle 100 based on the operation amount itself of the first braking operation unit 11 or may change the change gradient based on the change gradient of the operation amount of the first braking operation unit 11.

As described above, in step S203, for example, since the amplification of the first wheel cylinder pressure is prohibited and the braking force generated in the straddle-type vehicle 100 is amplified, a decrease in the first master cylinder pressure due to the amplification of the first wheel cylinder pressure is suppressed. In this case, since the information about the operation amount of the first braking operation unit 11 is properly acquired by using the first master cylinder pressure, the execution unit 62 can amplify the braking force generated in the straddle-type vehicle 100 based on the information about the operation amount of the first braking operation unit 11.

Further, as described above, in step S203, for example, even when the second wheel cylinder pressure is amplified more than the first wheel cylinder pressure so that the braking force generated in the straddle-type vehicle 100 is amplified, a decrease in the first master cylinder pressure due to the amplification of the first wheel cylinder pressure is suppressed. Also in this case, since the information about the operation amount of the first braking operation unit 11 is properly acquired by using the first master cylinder pressure, the execution unit 62 can amplify the braking force generated in the straddle-type vehicle 100 based on the information about the operation amount of the first braking operation unit 11.

In other words, a case in which the determination is NO in step S202 is a case in which the braking operation is performed with the operation of the second braking operation unit 13 stronger than the operation of the first braking operation unit 11. In this case, in step S204, the execution unit 62 amplifies the braking force generated in the straddle-type vehicle 100 with the amplification of the first wheel cylinder pressure superior to the amplification of the second wheel cylinder pressure and ends the control flow shown in FIG. 6.

In step S204, the execution unit 62 prohibits, for example, the amplification of the second wheel cylinder pressure and amplifies the braking force generated in the straddle-type vehicle 100. In this case, the execution unit 62 amplifies the braking force generated in the straddle-type vehicle 100 by amplifying the first wheel cylinder pressure without amplifying the second wheel cylinder pressure.

As described above, when it is determined that the rider performs the braking operation with the operation of the second braking operation unit 13 superior to the operation of the first braking operation unit 11, the execution unit 62 prohibits, for example, the amplification of the second wheel cylinder pressure and amplifies the braking force generated in the straddle-type vehicle 100. For example, when the second braking operation unit 13 is operated but the first braking operation unit 11 is not operated, the execution unit 62 prohibits the amplification of the second wheel cylinder pressure and amplifies the braking force generated in the straddle-type vehicle 100. Accordingly, it is possible to effectively suppress a decrease in the second master cylinder pressure due to the amplification of the second wheel cylinder pressure. For example, it is possible to suppress the occurrence of pedal suction. Therefore, it is possible to effectively suppress a decrease in the determination accuracy on whether or not the second braking operation unit 13 mainly used in the braking operation is operated.

Further, in step S204, for example, the execution unit 62 amplifies the first wheel cylinder pressure more than the second wheel cylinder pressure and amplifies the braking force generated in the straddle-type vehicle 100. In this case, for example, the execution unit 62 may perform the amplification of the first wheel cylinder pressure and the amplification of the second wheel cylinder pressure so that the amplification amount of the first wheel cylinder pressure becomes larger than the amplification amount of the second wheel cylinder pressure. Further, for example, the execution unit 62 may perform the amplification of the first wheel cylinder pressure and the amplification of the second wheel cylinder pressure so that the change gradient of the first wheel cylinder pressure becomes larger than the change gradient of the second wheel cylinder pressure.

As described above, when it is determined that the rider performs the braking operation with the operation of the second braking operation unit 13 superior to the operation of the first braking operation unit 11, for example, the execution unit 62 amplifies the first wheel cylinder pressure more than the second wheel cylinder pressure and amplifies the braking force generated in the straddle-type vehicle 100. For example, when the second braking operation unit 13 is operated but the first braking operation unit 11 is not operated, the execution unit 62 amplifies the first wheel cylinder pressure more than the second wheel cylinder pressure and amplifies the braking force generated in the straddle-type vehicle 100. Accordingly, it is possible to suppress a decrease in the second master cylinder pressure due to the amplification of the second wheel cylinder pressure and to suppress a decrease in the determination accuracy on whether or not the second braking operation unit 13 is operated as in the case of prohibiting the amplification of the second wheel cylinder pressure and amplifying the braking force generated in the straddle-type vehicle 100.

Here, the execution unit 62 may amplify the braking force generated in the straddle-type vehicle 100 based on the information about the operation amount of the second braking operation unit 13. Accordingly, it is possible to optimize the amplification of the braking force generated in the straddle-type vehicle 100 according to the rider's intension in the driving support mode. The information about the operation amount of the second braking operation unit 13 can include, for example, the operation amount itself of the second braking operation unit 13 and the change gradient of the operation amount of the second braking operation unit 13. Additionally, the determination unit 63 can acquire the operation amount of the second braking operation unit 13 and the change gradient of the operation amount based on the second master cylinder pressure.

For example, the execution unit 62 may change the amplification amount of the braking force in the amplification of the braking force generated in the straddle-type vehicle 100 based on the operation amount itself of the second braking operation unit 13 or may change the amplification amount based on the change gradient of the operation amount of the second braking operation unit 13. Further, for example, the execution unit 62 may change the change gradient of the braking force in the amplification of the braking force generated in the straddle-type vehicle 100 based on the operation amount itself of the second braking operation unit 13 or may change the change gradient based on the change gradient of the operation amount of the second braking operation unit 13.

As described above, in step S204, for example, since the amplification of the second wheel cylinder pressure is prohibited and the braking force generated in the straddle-type vehicle 100 is amplified, a decrease in the second master cylinder pressure due to the amplification of the second wheel cylinder pressure is suppressed. In this case, since the information about the operation amount of the second braking operation unit 13 is properly acquired by using the second master cylinder pressure, the execution unit 62 can amplify the braking force generated in the straddle-type vehicle 100 based on the information about the operation amount of the second braking operation unit 13.

Further, as described above, in step S204, for example, even when the first wheel cylinder pressure is amplified more than the second wheel cylinder pressure so that the braking force generated in the straddle-type vehicle 100 is amplified, a decrease in the second master cylinder pressure due to the amplification of the second wheel cylinder pressure is suppressed. Also in this case, since the information about the operation amount of the second braking operation unit 13 is properly acquired by using the second master cylinder pressure, the execution unit 62 can amplify the braking force generated in the straddle-type vehicle 100 based on the information about the operation amount of the second braking operation unit 13.

In the above description, an example of the process related to the driving support mode has been described with reference to FIGS. 5 and 6. However, the process executed by the controller 60 is not limited to the above-described example.

For example, in the driving support mode, the execution unit 62 may prohibit the amplification of the braking force generated in the straddle-type vehicle 100 when the rider performs the braking operation using both the first braking operation unit 11 and the second braking operation unit 13. In order to amplify the braking force generated in the straddle-type vehicle 100, it is necessary to amplify at least one of the first wheel cylinder pressure and the second wheel cylinder pressure. Therefore, at least one of a decrease in the first master cylinder pressure due to the amplification of the first wheel cylinder pressure and a decrease in the second master cylinder pressure due to the amplification of the second wheel cylinder pressure occurs. Thus, the amplification of the braking force generated in the straddle-type vehicle 100 may be prohibited when the braking operation is performed by using both the first braking operation unit 11 and the second braking operation unit 13 from the viewpoint of avoiding both a decrease in the determination accuracy on whether or not the first braking operation unit 11 is operated and a decrease in the determination accuracy on whether or not the second braking operation unit 13 is operated.

<Effect of Controller>

An effect of the controller 60 according to the embodiment of the present invention will be described.

In the controller 60, in the driving support mode, the execution unit 62 amplifies the braking force generated in the straddle-type vehicle 100 with the amplification of the second wheel cylinder pressure superior to the amplification of the first wheel cylinder pressure when the rider performs the braking operation with the operation of the first braking operation unit 11 superior to the operation of the second braking operation unit 13. Accordingly, when the first braking operation unit 11 is mainly used in the braking operation, it is possible to suppress a decrease in the first master cylinder pressure due to the amplification of the first wheel cylinder pressure and a decrease in the determination accuracy on whether or not the first braking operation unit 11 is operated.

On the other hand, in the driving support mode, the execution unit 62 amplifies the braking force generated in the straddle-type vehicle 100 with the amplification of the first wheel cylinder pressure superior to the amplification of the second wheel cylinder pressure when the rider performs the braking operation with the operation of the second braking operation unit 13 superior to the operation of the first braking operation unit 11. Accordingly, when the second braking operation unit 13 is mainly used in the braking operation, it is possible to suppress a decrease in the second master cylinder pressure due to the amplification of the second wheel cylinder pressure and to suppress a decrease in the determination accuracy on whether or not the second braking operation unit 13 is operated.

As described above, it is possible to suppress a decrease in the determination accuracy on whether or not the braking operation unit mainly used in the braking operation is operated. Therefore, since it is possible to improve the determination accuracy on whether or not the braking operation is performed, it is possible to properly execute the driving support mode depending on whether or not the braking operation is performed and to suppress a large fluctuation in the braking force generated in the straddle-type vehicle 100 against the rider's intention. Therefore, it is possible to properly improve the safety of the straddle-type vehicle 100. Particularly, in the driving support mode, when the braking force generated in the straddle-type vehicle 100 is amplified based on the surrounding environment information, it is important to suppress a large fluctuation in the braking force generated in the straddle-type vehicle 100 against the rider's intension.

Preferably, in the controller 60, in the driving support mode, the execution unit 62 prohibits the amplification of the first wheel cylinder pressure and amplifies the braking force generated in the straddle-type vehicle 100 when the rider performs the braking operation with the operation of the first braking operation unit 11 superior to the operation of the second braking operation unit 13. Accordingly, it is possible to effectively suppers a decrease in the first master cylinder pressure due to the amplification of the first wheel cylinder pressure. For example, it is possible to suppress the occurrence of lever suction. Therefore, it is possible to effectively suppress a decrease in the determination accuracy on whether or not the first braking operation unit 11 mainly used in the braking operation is operated.

Preferably, in the controller 60, in the driving support mode, the execution unit 62 amplifies the second wheel cylinder pressure more than the first wheel cylinder pressure and amplifies the braking force generated in the straddle-type vehicle 100 when the rider performs the braking operation with the operation of the first braking operation unit 11 superior to the operation of the second braking operation unit 13. Accordingly, it is possible to suppress a decrease in the first master cylinder pressure due to the amplification of the first wheel cylinder pressure and to suppress a decrease in the determination accuracy on whether or not the first braking operation unit 11 is operated as in the case of prohibiting the amplification of the first wheel cylinder pressure and amplifying the braking force generated in the straddle-type vehicle 100.

Preferably, in the controller 60, in the driving support mode, the execution unit 62 amplifies the braking force generated in the straddle-type vehicle 100 based on the information about the operation amount of the first braking operation unit 11. Accordingly, it is possible to optimize the amplification of the braking force generated in the straddle-type vehicle 100 according to the rider's intension in the driving support mode.

Preferably, in the controller 60, in the driving support mode, the execution unit 62 prohibits the amplification of the second wheel cylinder pressure and amplifies the braking force generated in the straddle-type vehicle 100 when the rider performs the braking operation with the operation of the second braking operation unit 13 superior to the operation of the first braking operation unit 11. Accordingly, it is possible to effectively suppress a decrease in the second master cylinder pressure due to the amplification of the second wheel cylinder pressure. For example, it is possible to suppress the occurrence of pedal suction. Therefore, it is possible to effectively suppress a decrease in the determination accuracy on whether or not the second braking operation unit 13 mainly used in the braking operation is operated.

Preferably, in the controller 60, in the driving support mode, the execution unit 62 amplifies the first wheel cylinder pressure more than the second wheel cylinder pressure and amplifies the braking force generated in the straddle-type vehicle 100 when the rider performs the braking operation with the operation of the second braking operation unit 13 superior to the operation of the first braking operation unit 11. Even by that, it is possible to suppress a decrease in the second master cylinder pressure due to the amplification of the second wheel cylinder pressure and to suppress a decrease in the determination accuracy on whether or not the second braking operation unit 13 is operated as in the case of prohibiting the amplification of the second wheel cylinder pressure and amplifying the braking force generated in the straddle-type vehicle 100.

Preferably, in the controller 60, in the driving support mode, the execution unit 62 amplifies the braking force generated in the straddle-type vehicle 100 based on the information about the operation amount of the second braking operation unit 13. Accordingly, it is possible to optimize the amplification of the braking force generated in the straddle-type vehicle 100 according to the rider's intension in the driving support mode.

Preferably, in the controller 60, in the driving support mode, the execution unit 62 prohibits the amplification of the braking force generated in the straddle-type vehicle 100 when the rider performs the braking operation by using both the first braking operation unit 11 and the second braking operation unit 13. Accordingly, it is possible to effectively suppress both a decrease in the determination accuracy on whether or not the first braking operation unit 11 is operated and a decrease in the determination accuracy on whether or not the second braking operation unit 13 is operated.

Preferably, in the controller 60, the surrounding environment information includes the collision possibility information. The execution unit 62 amplifies, in the driving support mode, the braking force generated in the straddle-type vehicle 100 based on the collision possibility information. Accordingly, the possibility of avoiding the collision with the preceding vehicle or the like is improved and the safety is improved.

Preferably, in the controller 60, the surrounding environment information includes the information about the inter-vehicle distance between the straddle-type vehicle 100 and the target vehicle and the execution unit 62 amplifies, in the driving support mode, the braking force generated in the straddle-type vehicle 100 based on the information about the inter-vehicle distance. Accordingly, the inter-vehicle distance or the passage time difference with the target vehicle such as the preceding vehicle is properly ensured and the safety is improved.

The present invention is not limited to the description of the embodiment. For example, only a part of the embodiment may be implemented.

REFERENCE SIGNS LIST

1: Body
2: Handle

3: Front wheel
3a: Rotor
4: Rear wheel
4a: Rotor
10: Brake system
11: First braking operation unit
12: Front wheel brake mechanism
13: Second braking operation unit
14: Rear wheel brake mechanism
21a: First master cylinder
21b: Second master cylinder
22a: First reservoir
22b: Second reservoir
23a: First brake caliper
23b: Second brake caliper
24a: First wheel cylinder
24b: Second wheel cylinder
25a: Main flow path
25b: Main flow path
26a: Sub-flow path
26b: Sub-flow path
27a: Supply flow path
27b: Supply flow path
31: Inlet valve
31a: Inlet valve
31b: Inlet valve
32: Outlet valve
32a: Outlet valve
32b: Outlet valve
33a: Accumulator
33b: Accumulator
34: Pump
34a: Pump
34b: Pump
35: First valve
35a: First valve
35b: First valve
36: Second valve
36a: Second valve
36b: Second valve
41: Front wheel speed sensor
42: Rear wheel speed sensor
43: Surrounding environment sensor
44a: First master cylinder pressure sensor
44b: Second master cylinder pressure sensor
50: Hydraulic pressure control unit
51: Base body
60: Controller
61: Acquisition unit
62: Execution unit
63: Determination unit
100: Straddle-type vehicle.

The invention claimed is:

1. A controller (60) configured to maneuver a straddle-type vehicle (100), the straddle-type vehicle (100) including: a first wheel cylinder (24a) which is a wheel cylinder of a front wheel (3); a first braking operation unit (11) which is a braking operation unit configured to change a first wheel cylinder pressure corresponding to a pressure of a braking liquid of the first wheel cylinder (24a); a first master cylinder (21a) provided to the first braking operation unit (11); a second wheel cylinder (24b) which is a wheel cylinder of a rear wheel (4); a second braking operation unit (13) which is a braking operation unit configured to change a second wheel cylinder pressure corresponding to a pressure of a braking liquid of the second wheel cylinder (24b); and a second master cylinder (21b) provided to the second braking operation unit (13), the controller comprising:

an acquisition unit (61) configured to acquire:

a first master cylinder pressure corresponding to a pressure of a braking liquid of the first master cylinder (21a); and a second master cylinder pressure corresponding to a pressure of a braking liquid of the second master cylinder (21b);

a determination unit (63) configured to determine, based on at least one of the first master cylinder pressure and the second master cylinder pressure acquired by the acquisition unit (61), whether a rider of the straddle-type vehicle (100) performs a braking operation; and an execution unit (62) configured to execute a driving support mode, in which a braking force generated in the straddle-type vehicle (100) is amplified, when the determination unit (63) determines that the braking operation is performed, wherein the execution unit (62), in the driving support mode, amplifies:

the braking force generated in the straddle-type vehicle (100), based on surrounding environment information about environment around the straddle-type vehicle (100);

the braking force generated in the straddle-type vehicle (100) with the amplification of the second wheel cylinder pressure superior to the amplification of the first wheel cylinder pressure in response to determining that the rider performs the braking operation with the operation of the first braking operation unit (11) superior to the operation of the second braking operation unit (13); and the braking force generated in the straddle-type vehicle (100) with the amplification of the first wheel cylinder pressure superior to the amplification of the second wheel cylinder pressure in response to determining that the rider performs the braking operation with the operation of the second braking operation unit (13) superior to the operation of the first braking operation unit (11).

2. The controller according to claim 1, wherein in the driving support mode, the execution unit (62) prohibits the amplification of the first wheel cylinder pressure and amplifies the braking force generated in the straddle-type vehicle (100) when the rider performs the braking operation with the operation of the first braking operation unit (11) superior to the operation of the second braking operation unit (13).

3. The controller according to claim 1, wherein in the driving support mode, the execution unit (62) amplifies the second wheel cylinder pressure more than the first wheel cylinder pressure so that the braking force generated in the straddle-type vehicle (100) is amplified when the rider performs the braking operation with the operation of the first braking operation unit (11) superior to the operation of the second braking operation unit (13).

4. The controller according to claim 2, wherein in the driving support mode, the execution unit (62) amplifies the braking force generated in the straddle-type vehicle (100) based on information about an operation amount of the first braking operation unit (11).

5. The controller according to claim 1, wherein in the driving support mode, the execution unit (62) prohibits the amplification of the second wheel cylinder pressure and amplifies the braking force generated in the straddle-type vehicle (100) when the rider performs the braking operation with the operation of the second braking operation unit (13) superior to the operation of the first braking operation unit (11).

6. The controller according to claim 1, wherein in the driving support mode, the execution unit (62) amplifies the first wheel cylinder more than the second wheel cylinder pressure so that the braking force generated in the straddle-type vehicle (100) is amplified when the rider performs the braking operation with the operation of the second braking operation unit (13) superior to the operation of the first braking operation unit (11).

7. The controller according to claim 5, wherein the execution unit (62) amplifies the braking force generated in the straddle-type vehicle (100) in the driving support mode based on information about an operation amount of the second braking operation unit (13).

8. The controller according to claim 1, wherein the execution unit (62) prohibits the amplification of the braking force generated in the straddle-type vehicle (100) when the rider performs the braking operation by using both the first braking operation unit (11) and the second braking operation unit (13) in the driving support mode.

9. The controller according to claim 1, wherein the surrounding environment information includes collision possibility information regarding the straddle-type vehicle (100), and the execution unit (62) amplifies the braking force generated in the straddle-type vehicle (100) in the driving support mode based on the collision possibility information.

10. The controller according to claim 1, wherein the surrounding environment information includes information about an inter-vehicle distance between the straddle-type vehicle (100) and a target vehicle, and the execution unit (62) amplifies the braking force generated in the straddle-type vehicle (100) in the driving support mode based on the information about the inter-vehicle distance.

11. A control method for maneuvering a straddle-type vehicle (100), the straddle-type vehicle (100) including: a first wheel cylinder (24a) which is a wheel cylinder of a front wheel (3); a first braking operation unit (11) which is a braking operation unit configured to change a first wheel cylinder pressure corresponding to a pressure of a braking liquid of the first wheel cylinder (24a); a first master cylinder (21a) provided to the first braking operation unit (11); a second wheel cylinder (24b) which is a wheel cylinder of a rear wheel (4); a second braking operation unit (13) which is a braking operation unit configured to change a second wheel cylinder pressure corresponding to a pressure of a braking liquid of the second wheel cylinder (24b); and a second master cylinder (21b) provided to the second braking operation unit (13), the control method comprising:

acquiring, using an acquisition unit (61) of a controller (60):

a first master cylinder pressure corresponding to a pressure of a braking liquid of the first master cylinder (21a); and a second master cylinder pressure corresponding to a pressure of a braking liquid of the second master cylinder (21b);

determining, using a determination unit (63) of the controller (60), whether a rider of the straddle-type vehicle (100) performs a braking operation, based on at least one of the first master cylinder pressure and the second master cylinder pressure acquired by the acquisition unit (61); and executing, using an execution unit (62) of the controller (60), a driving support mode, in which a braking force generated in the straddle-type vehicle (100) is amplified, when the determination unit (63) determines that the braking operation is performed, wherein the execution unit (62), in the driving support mode, amplifies:

the braking force generated in the straddle-type vehicle (100), based on surrounding environment information about environment around the straddle-type vehicle (100);

the braking force generated in the straddle-type vehicle (100) with the amplification of the second wheel cylinder pressure superior to the amplification of the first wheel cylinder pressure in response to determining that the rider performs the braking operation with the operation of the first braking operation unit (11) superior to the operation of the second braking operation unit (13); and the braking force generated in the straddle-type vehicle (100) with the amplification of the first wheel cylinder pressure superior to the amplification of the second wheel cylinder pressure in response to determining that the rider performs the braking operation with the operation of the second braking operation unit (13) superior to the operation of the first braking operation unit (11).

* * * * *